Figure 6:
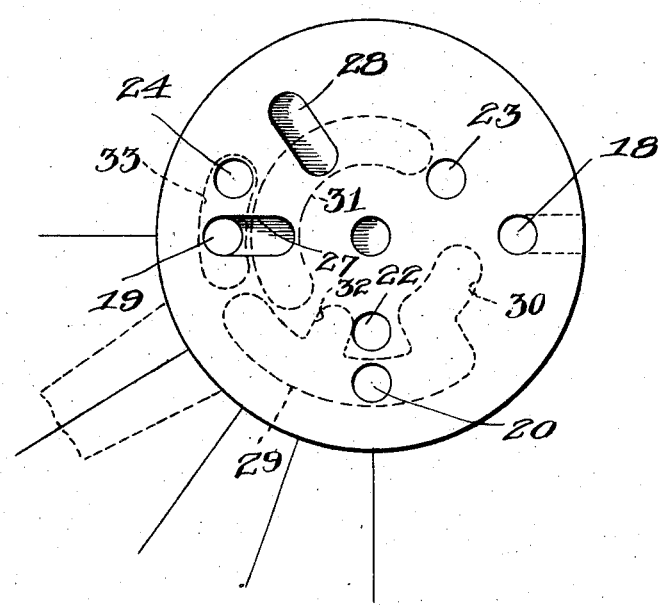

F. E. PATTON.
AIR BRAKE SYSTEM.
APPLICATION FILED JULY 5, 1910.
1,025,298.
Patented May 7, 1912.
3 SHEETS—SHEET 1.
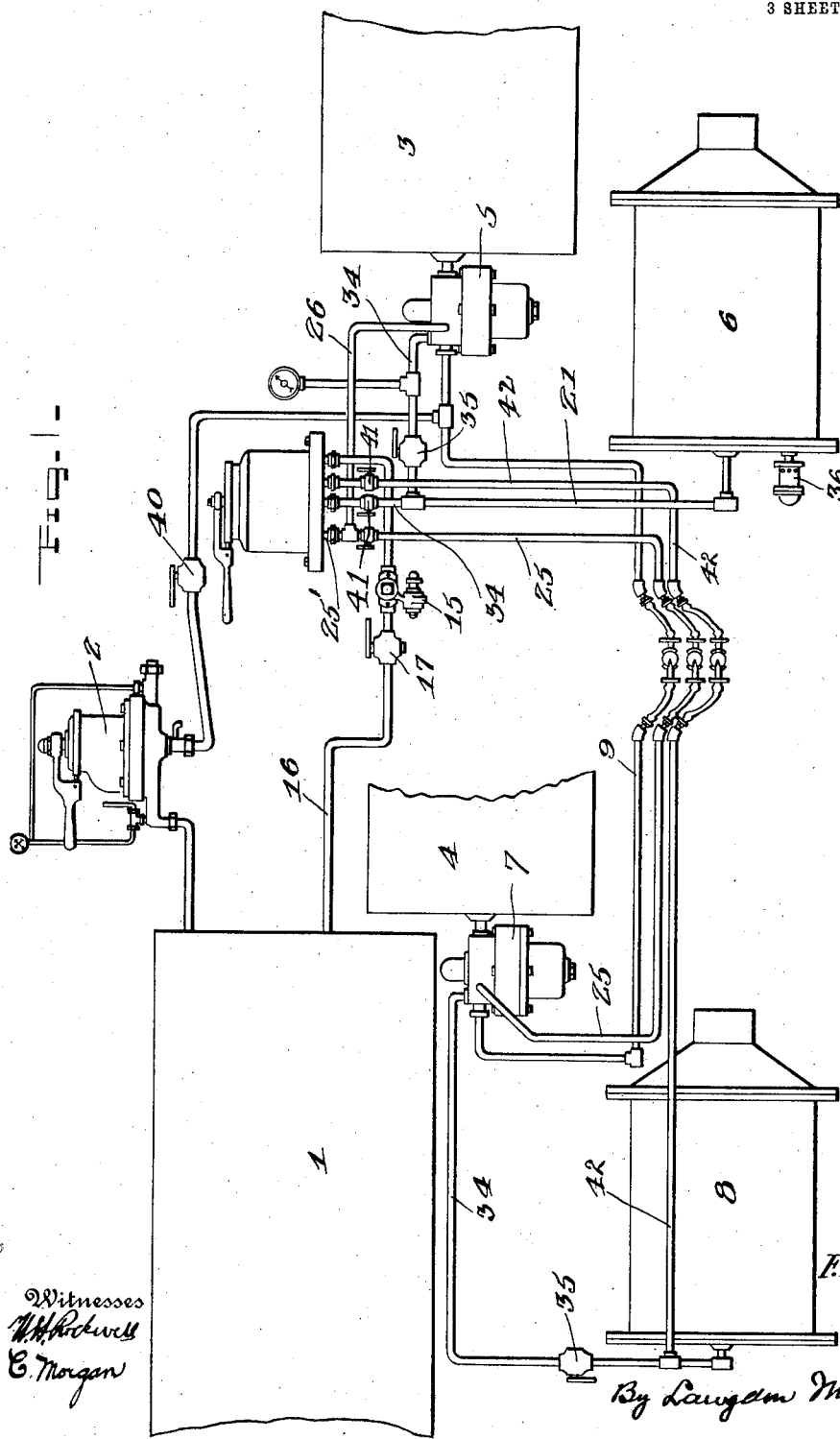
Witnesses
Inventor
F. E. Patton
By Langdon Moore
Attorney F. E. PATTON.
AIR BRAKE SYSTEM.
APPLICATION FILED JULY 5, 1910.
1,025,298.
Patented May 7, 1912.
3 SHEETS—SHEET 2.
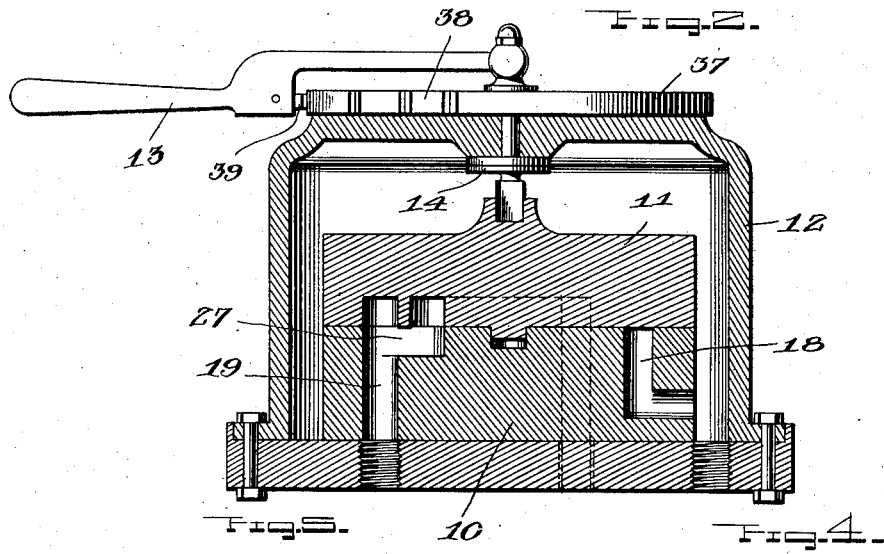
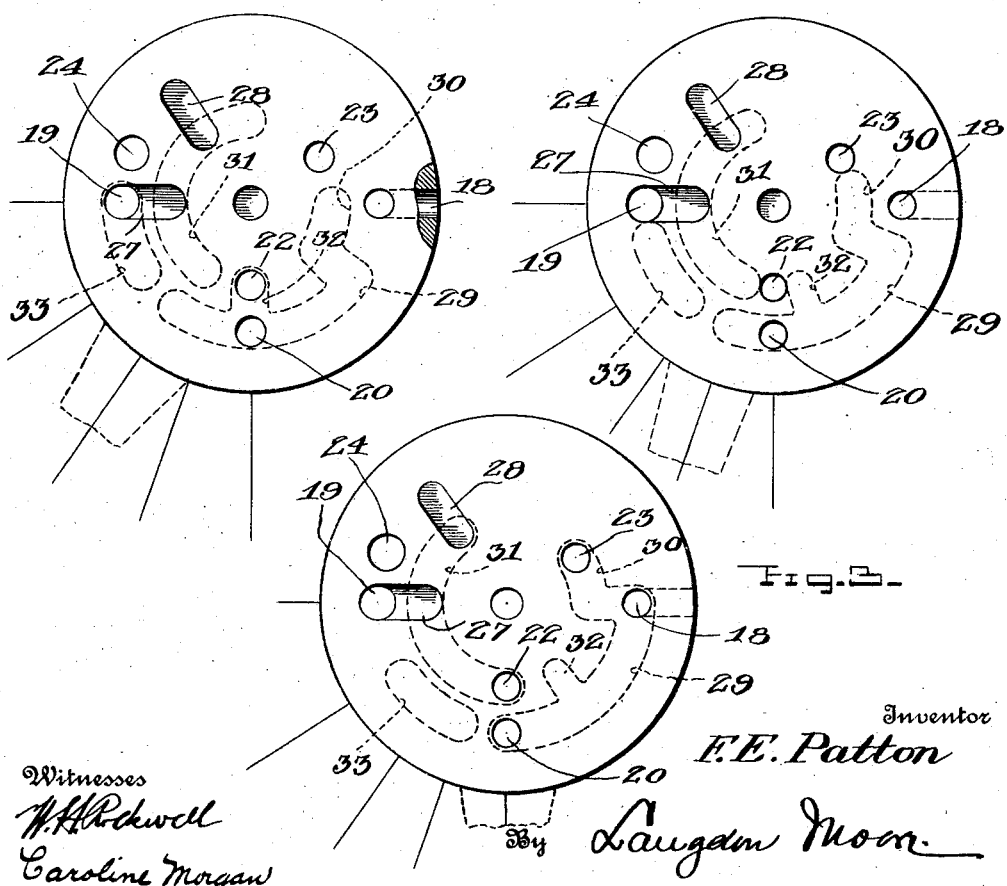

F. E. PATTON.
AIR BRAKE SYSTEM.
APPLICATION FILED JULY 5, 1910.

1,025,298.

Patented May 7, 1912.
3 SHEETS—SHEET 3.

Witnesses
W. H. Rodwell
Antonio Calvert

Inventor
F. E. Patton
By Langdon Moon
Attorney

UNITED STATES PATENT OFFICE.

FRANK E. PATTON, OF JACKSON, TENNESSEE.

AIR-BRAKE SYSTEM.

1,025,298. Specification of Letters Patent. Patented May 7, 1912.

Application filed July 5, 1910. Serial No. 570,358.

*To all whom it may concern:*

Be it known that I, FRANK E. PATTON, a citizen of the United States, residing at Jackson, in the county of Madison and State of Tennessee, have invented new and useful Improvements in Air-Brake Systems, of which the following is a specification.

This invention relates to improvements in air brake systems, and more particularly to the application of a combined straight air brake and retaining valve for operating the engine and tender brakes independently of the train line in an automatic air brake system such as is at present used upon railroad trains.

The object of this invention is to provide a combined straight air brake and retaining valve, which may be operated independently of the engineer's valve in an automatic brake system for railway trains to operate the brakes upon the engine and tender independently of the train brakes, so that the engine, tender and train brakes may be applied by the automatic system and the brakes upon the drivers of the engine released while the brakes upon the tender and train are retained; the brakes upon the engine and tender released, while the brakes upon the train are retained; the brakes upon the train released, while the brakes upon the engine and tender are retained; and the brakes upon the tender retained, while the brakes upon the engine and train are released.

In the most recent automatic air brake system adopted by the railroads, the engine and tender brakes are operated by a triple valve carried upon the engine, so that should an engine be pushing a train load of cars up hill and the tender break loose it would run away.

It is a further object in carrying out this invention to automatically apply the brakes upon the tender should such an accident occur.

The combined straight air brake and retaining valve will apply and release the brakes on the engine and tender independent of the automatic brake, and yet the automatic brake can be applied or released on the engine, tender and train, while the improved valve is in running position. The train brakes can be released and the engine and tender brakes remain applied on long freight trains to keep the train bunched, when releasing during a slow down and the train has a chance to adjust itself and prevent damage to the draft gear. An engine provided with this improved valve in double heading can be controlled by the automatic system in connection with the engine controlling the train brakes and yet the brakes upon this engine can be operated independently thereof by this valve. An engine carrying this improved valve can be hauled dead in a train and the brakes upon this engine can be applied or released in the same manner as one of the cars of the train. The capacity of the additional piping necessary to the application of this combined air brake and retainer valve can be compensated for by shortening the piston travel.

This improved valve is of very simple construction and therefore less liable to get out of order than most independent braking apparatus. Passenger stops can be made more smoothly and therefore shorten the schedule of running time. The insertion of this combined straight air brake and retainer valve in an automatic system in no way affects the efficiency of the application or release of the brakes by the automatic system. The engineer may have at all times the braking effect of the tender at his disposal without endangering the tires upon the engine drivers. This brake has no equalizing apparatus attached to it nor has it any check valve to give trouble as check valves corrode with scale or rust causing them to stick or leak and render the brake inoperative. The air pressure controlled by this combined straight air brake and retaining valve is taken directly from the main reservoir and reduced to the desired brake cylinder pressure. The pipes are all tapped in to the bottom of the valve body, so that the valve can be placed in a convenient place near the automatic brake valve without obstructing the limited space on locomotives, and the positions of the brake handle are nearly the same as in the engineer's automatic brake which will avoid confusion.

While the preferred form of this invention is illustrated in the accompanying sheets of drawing, yet it is to be understood that minor detail changes may be made without departing from the scope thereof.

Figure 7:
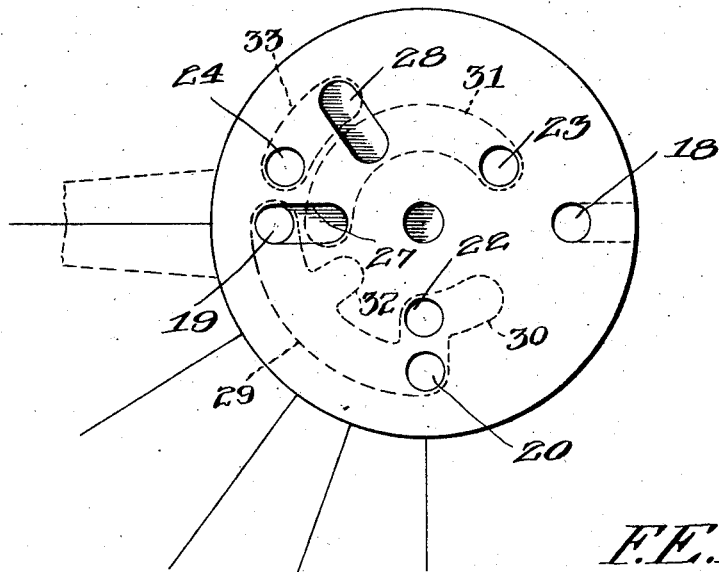

Figure 1 is a diagrammatical view, showing the manner in which this invention is applied to an engine employing an automatic air brake system and the parts necessary to such automatic air brake systems. Fig. 2 is a view in transverse vertical section taken through the combined straight air brake and retaining valve. Fig. 3 is a top plan view of the stationary circular seat of this valve showing in dotted lines the positions occupied by the air ducts in the rotatable valve member when the brakes upon the engine and tender are applied. Fig. 4 is a view similar to Fig. 3, showing in dotted lines the position occupied by the air ducts in the rotatable valve member when in lap position. Fig. 5 is a view similar to Fig. 3, showing in dotted lines the position of the air ducts in the rotatable members when in position to release the engine brake. Fig. 6 is a view similar to Fig. 3, showing in dotted lines the position of the air ducts in the rotatable member when in the running position. Fig. 7 is a view similar to Fig. 3, showing in dotted lines the position of the air ducts in the rotatable member when in full release position.

The usual automatic air brake system is shown as employing a main reservoir 1, an automatic brake valve 2, an auxiliary reservoir upon the engine 3, an auxiliary reservoir upon the tender 4, a triple valve 5 in connection with the auxiliary reservoir upon the engine, and with the driver brake cylinders 6 upon the engine, a triple valve 7 in connection with the auxiliary reservoir upon the tender and with the tender brake cylinders 8 and the usual piping 9 connecting the triple valves upon the engine and tender to operate them both from the automatic valve and the customary connection to the train brakes. The connections to the train brakes are not shown as they form no part of this invention.

The combined straight air brake and retaining valve comprises a circular stationary seat member 10 and a corresponding circular rotatable member 11 retained above the seat within a casing 12 and operated by a lever 13 extending upon the outside of the casing. The stationary seat member is provided with six ports leading therethrough and opening with one exception upon the under side of the valve casing. These ports are arranged in the position and manner shown in Fig. 3 of the drawing. Besides the six ports the upper portion of the stationary seat member is provided with two ducts upon the upper surface thereof as shown in Fig. 3 of the drawing. The rotatable member 11 is centered upon the seat member 10 by a central projection entering a central recess in the upper surface of the seat member. The lower surface of the rotatable member adjacent the upper surface of the seat member is provided with a plurality of recessed air ducts arranged in the positions and manner shown in dotted lines in Fig. 3. There is an air space provided between the two members of the valve and the outer casing, and the operating shaft leading upward through the top of the casing from the rotatable member is provided with a gasket 14 in engagement with the upper portion of the valve casing. The air from the main reservoir is admitted to the casing at one side of the stationary seat member which will hold the gasket in position against the wall of the casing and also insure the rotatable member being held firmly and yet rotatably in contact with the seat member. A reducing valve 15 is provided in the supply pipe 16 from the main reservoir, so that the pressure entering the valve may be reduced to a predetermined brake cylinder pressure. A cut-out cock 17 is placed in the supply pipe between the reducing valve and main reservoir whereby the improved valve may be cut out for the purpose of repairs or cleaning without affecting the automatic brake system.

With the exception of the main air port, the ports in the stationary seat extend directly therethrough, but the main air port 18 opens on the side of the stationary member and communicates with the space between the valve members and the casing, which in turn is in communication with the main air reservoir. Diametrically across the valve seat from the main air port 18 and at the same distance from the center is a main exhaust port 19 leading to the atmosphere on the under side of the valve casing. At the same distance from the center as these two ports and half way between them is the engine brake cylinder port 20 which is connected by a pipe 21 leading directly to the driver brake cylinders. A short distance nearer the center from this port is a second exhaust port 22 which leads to the atmosphere on the under side of the casing. On the opposite side of the main air port 18 and at the same distance from the center as the second exhaust port 22 is the tender brake cylinder port 23 which is connected by a pipe 42 leading directly to the tender brake cylinders. At the same distance from the center as the engine brake cylinder port 20 and main exhaust port 19 opposite main reservoir port 18, but on the farther side from the engine brake cylinder port 20 is a retaining port 24 which is connected by a pipe 25 to the triple valve in the tender and by a pipe 26 branching therefrom to the triple valve in the engine. A radial recessed air duct 27 leads inward from the main exhaust port 19 and is terminated at a point at the same distance from the center as the second exhaust port 22 and tender brake cylinder port 23. On the farther side of the retaining port 24 a similar recessed air duct 28 is placed in an isolated position.

The under side of the rotatable valve member 11 adjacent the upper surface of the stationary seat is provided with three recessed air ducts for the purpose of connecting the main air and release ports with the ports necessary to the operation of the valve. When the valve is in the position shown in Fig. 3, one of the concentric air ducts 29 places the main air port in communication with the driver brake cylinder port and through a branch leading into a similar concentric duct 30 of smaller radius, the tender brake cylinder port is placed in communication with the main air port. A second concentric air duct 31 places the second release port 22 behind the driver brake cylinder port 20 in communication with the inner extremities of the air ducts 27 and 28 upon the upper surface of the stationary member.

When the valve is in the second position shown in dotted lines upon Fig. 4, it is in lapped position as none of the ports are placed in operative communication with each other by the air ducts in the rotatable member.

In the third position shown in dotted lines upon Fig. 5, the air duct 29 formerly connecting the main reservoir port with the tender and engine brake cylinder port is moved out of communication from the main reservoir port. This duct is provided with a branch 32 which in this position will communicate from the driver brake cylinder port 20 with the second exhaust port 22 at the rear of the driver brake cylinder port, while all outer ports are out of communication.

In the fourth position shown in dotted lines in Fig. 6, the ducts 29, 30, 31 and 32, formerly described, are moved out of operative connection with any of the ports in the seat of the valve. A third concentric air duct 33 is provided which in this position will form a means of communication between the retaining port 24 and main exhaust port 19.

In the fifth position, shown in dotted lines in Fig. 7, the first duct 29 will form a means of communication from the driver brake cylinder port 20 to the exhaust port 22 at the rear of the driver brake cylinder port 20 and also from this port 20 to the main exhaust port 19. The second concentric duct 31 of less diameter than the other two places the tender cylinder brake port 23 in communication with the duct 27 on the surface of the stationary valve member leading from the exhaust port 19. The third concentric duct 33 places the retaining port 24 in communication with the outer end of the second duct 28 upon the upper surface of the stationary valve member, and this duct 28 at its other extremity is in communication with the second duct 31 upon the rotatable member as clearly shown in Fig. 7.

As previously stated a triple valve with an auxiliary reservoir is carried by both the engine and tender to be operated by the regular engineer's automatic brake valve. The regular pipe leading from the triple valve upon the engine to the driver brake cylinders is joined by a similar pipe leading from the driver brake cylinder port 20 in the improved valve. The regular pipe 34 leading from the triple valve upon the tender to the tender brake cylinders is joined by a similar pipe 42 leading from the tender brake cylinder port 23 in the improved valve. The customary pipe 9 connecting the triple valves is connected to the automatic brake valve 2. The regular retaining pipes 25 and 26 connecting the triple valves join an enlarged pipe 25′ leading to the retaining port 24 in the improved valve. A cut out valve 35 is provided between each triple valve and the corresponding brake cylinders, so that should the occasion arise the triple valves may be cut out and the brakes operated by the straight air feature of the improved valve. A safety valve 36 is provided on the brake cylinders or pipe connections to prevent the pressure becoming excessive in case the reducing valve should be defective.

The operation is as follows: Air under pressure from the main reservoir is conducted through a supply pipe and reducing valve therein to the space between the improved valve members and their outer casing, and from this space into the main air port. When the rotatable valve member is in the position indicated in dotted lines upon Fig. 3, the main air port will be in communication with the driver brake cylinder port and therefore apply the brakes directly in the cylinders independently of the engineer's automatic valve and at the same time in communication with the tender brake cylinders and will apply these brakes. This position will apply the brakes upon the engine and tender independently of the train brakes. In this position, the retaining port in the stationary seat will be closed and the retaining pipe connecting the two triple valves will be unaffected.

In the second position, shown in dotted lines upon Fig. 4, all of the ports will be lapped and the straight air brake features will be out of operation, so that the brakes on the engine and tender will be operatable by the engineer's automatic valve.

In the third position, shown in dotted lines upon Fig. 5, the driver brake cylinder port will be placed in communication with the exhaust port and therefore release the engine brakes. In this position, the retaining port and tender brake cylinder port will be closed.

In the fourth position, shown in dotted lines in Fig. 6, the retaining port will be placed in communication with the main exhaust port, while all other ports in the stationary seat are closed. This is called the running position, and in this position all brakes can be released with the automatic engineer's valve when the triple valves move to release positions as the retaining port is then opened to the atmosphere.

In the fifth position, shown in dotted lines in Fig. 7, all ports are placed in communication with the main exhaust port and second exhaust port, and this position is called full release.

With the exception of the first position, the main air port is closed in all positions of the rotatable member.

The top of the valve casing 12 is provided with a circular plate 37 provided with a groove 38 upon its circumference which will be traveled over by the operating lever. The lever 13 is provided with a spring pressed pin 39, which will indicate by coming in contact with the ends of this groove each of the extreme positions. A notch is provided in the groove corresponding to the running position and a projection is formed between the positions occupied when the valve is in lap and when the driver brake is released, so that when the pin encounters the sides of this projection it will indicate the proper position for the handle.

When the engine carrying this improved valve is double heading and its automatic system is in connection with the other engine, the cut-out cock 40 on its own automatic brake valve should be closed and the improved valve placed in the running position then the brake can be applied and released on this engine by the engine having control except when the engineer desires to hold them set on the engine during an application, or release the driver brake in case wheels are sliding or tires heating, which he can do with the improved valve. Each of the pipes leading from the improved valve is provided with a cut-out cock 41, and when the engine is hauled dead in a train the engineer's automatic valve cut-out cock 40 should be closed and the cut-out cocks 41 in the pipes leading to the driver brake and tender brake cylinders should be closed in the improved valve and the improved valve placed in running position, and the brakes can then be applied or released on the engine and tender the same as a car in the train.

The additional piping necessary to apply this valve to an automatic brake system is known as Westinghouse G—6—Equipment now adopted by many railroads will be one-half inch pipe from the improved valve to the driver brake cylinders and a one-half inch pipe from the improved valve to the tender brake cylinder, and a three-eighths inch pipe from the triple valve to the retaining pipe leading from the improved valve, and a one-half inch pipe leading from the retaining port in the improved valve to this connection. This additional piping will increase the brake cylinder capacity about one hundred cubic inches, which can be easily overcome by either increasing the auxiliary capacity in proportion or by shortening the piston travel.

What I claim is:—

1. In an automatic air brake system including a main reservoir, engineer's automatic brake valve, train pipe, brake cylinders, auxiliary reservoirs and triple valves upon the train units in connection with the train pipe for applying and releasing the brakes upon the units, a combined straight air and retainer valve, means in connection therewith for applying straight air from the main reservoir to both the engine and tender brakes independently of the automatic system and independently releasing the engine and tender brakes, and other means in connection with the engine and tender triple valves for retaining the engine and tender brakes upon an automatic release of the train brakes.

2. In an automatic air brake system including a main reservoir, engineer's automatic brake valve, train pipe, brake cylinders, auxiliary reservoirs, and triple valves upon the train units in connection with the train pipe for applying and releasing the brakes upon the units, a combined straight air and retainer valve, separate connections between the straight air and retainer valve and the engine and tender brake cylinders respectively for applying straight air directly from the main reservoir independently of the automatic system and independently releasing the engine and tender brakes through the straight air and retainer valve, and separate connections between the engine and tender triple valves and the straight air and retainer valve for retaining the engine and tender brakes by the straight air and retainer valve upon an automatic release of the train brakes.

3. In an automatic air brake system including a main reservoir, engineer's automatic air brake valve, train pipe, engine brake triple valve, auxiliary reservoir, and brake cylinders upon the engine, and a tender brake triple valve, auxiliary reservoir, and brake cylinders upon the tender, a combined straight air brake and retainer valve provided with ports connected respectively to the main reservoir, the retaining pipe between the triple valves on the engine and tender, to the brake cylinder on the engine, and to the brake cylinder on the tender, and means for connecting the main reservoir directly to both engine and tender brake cylinders and closing the retaining port independently of the automatic air brake system.

4. In an automatic air brake system including a main reservoir, engineer's automatic air brake valve, train pipe, engine brake triple valve, auxiliary reservoir, and brake cylinders upon the engine, and a tender brake triple valve, auxiliary reservoir, and brake cylinders upon the tender, a combined straight air brake and retainer valve provided with ports connected respectively to the main reservoir, the retainer pipe between the triple valves on the engine and tender, to the brake cylinders on the engine and to the brake cylinders on the tender and provided with an exhaust port leading to the atmosphere, and means for connecting the engine brake cylinder directly with the exhaust port and closing the other ports independently of the automatic air brake system.

5. In an automatic air brake system including a main reservoir, engineer's automatic air brake valve, train pipe, engine brake triple valve, auxiliary reservoir, brake cylinders upon the engine, and a tender brake triple valve, auxiliary reservoir, and brake cylinders upon the tender, a combined straight air brake and retainer valve, provided with ports connected respectively to the main reservoir, the retaining pipe between the triple valves on the engine and tender, to the brake cylinders on the engine and to the brake cylinders on the tender and provided with an exhaust port leading to the atmosphere, and means for connecting the retaining port to the exhaust port and closing the other ports independently of the automatic air brake system.

6. In an automatic air brake system including a main reservoir, engineer's automatic brake valve, train pipe, engine brake triple valve, auxiliary reservoir, brake cylinders upon the engine, and a tender brake triple valve, auxiliary reservoir, and brake cylinders upon the tender, a combined straight air brake and retainer valve provided with ports connected respectively to the main reservoir, the retaining pipe between the triple valves on the engine and tender, to the brake cylinders on the engine, and to the brake cylinders on the tender and provided with an exhaust port leading to the atmosphere, and means for closing the main reservoir port and connecting the other ports to the exhaust port independently of the automatic air brake system.

7. In an air brake apparatus for railway trains, valve mechanism including a valve seat provided with six ports, two of which communicating directly with the atmosphere form exhaust ports, two others adapted to communicate directly with the brake cylinders on the engine and tender respectively, another one adapted to communicate with the main reservoir, and the remaining one to the retainer pipe between the triple valves upon the engine and tender, and a rotatable valve member provided with air ducts adapted to assume positions upon the seat to connect the main reservoir to the brake cylinders upon the engine and tender respectively, to lap all ports, to connect the engine brake cylinder to the one exhaust port, and to connect the engine brake cylinders to both exhaust ports and the tender brake cylinders and retainer port to the last named exhaust port.

8. In an air brake apparatus for railway trains, valve mechanism including a casing, a valve seat upon one wall thereof, a valve member adapted to rotate upon the seat, said seat and member being of less size than the casing walls forming an air space therebetween, and a connection between said air space and the main reservoir, said seat provided with a plurality of ports leading directly therethrough and another port leading to said air space, a plurality of radial air ducts upon the surface of the seat, one of which leads from one of the through ports, a plurality of concentric air ducts and radial extensions therefrom upon the rotatable member adapted to operatively connect the ports and air ducts upon the seat.

9. In air brake apparatus for railway trains, valve mechanism including a casing, a circular valve seat and a concentric rotatable member within the casing, a plurality of spaced apart ports in the seat equi-distant from the center and at a different distance from the center a second plurality of spaced apart ports equi-distant from the center, a plurality of radial air ducts upon the surface of the seat extending from the line of one set of equi-distant ports to the line of the other set of equi-distant ports, and one of said ducts leading from one of said ports, a plurality of concentric air ducts upon the rotatable valve member arranged to lie over the respective sets of equi-distant ports and radial ducts from one set of concentric air ducts extending between the lines of the respective equi-distant ports, said concentric air ducts and extensions adapted to operatively connect the ports and radial ducts upon the seat.

FRANK E. PATTON.

Witnesses:
J. G. CARTER,
D. MERIWETHER.